Jan. 5, 1932.    A. R. HUTTON    1,839,761
BAND COUPLER
Filed March 9, 1927

INVENTOR:
Arthur R. Hutton
BY White, Prost & Fryer
his ATTORNEYS.

Patented Jan. 5, 1932

1,839,761

UNITED STATES PATENT OFFICE

ARTHUR R. HUTTON, OF ALBANY, CALIFORNIA, ASSIGNOR TO CALIFORNIA CORRUGATED CULVERT COMPANY, OF WEST BERKELEY, CALIFORNIA, A CORPORATION OF CALIFORNIA

BAND COUPLER

Application filed March 9, 1927. Serial No. 173,810.

It is often necessary to couple together a plurality of culverts or other pipe sections in order to form one continuous line. In the past couplers for this purpose have comprised a metal band formed of a single strip rolled to fit the external diameter of the culvert. The free edges were provided with bolts or other clamping means for contracting the band upon the ends of adjacent culvert sections. In applying a coupler of this type it is necessary to open the coupler by spreading the band with a bar or other means. As the coupler bands are generally corrugated circumferentially in a manner similar to the corrugations of the culvert, it is a difficult matter to spread them sufficiently to permit insertion of the culvert, especially when the band is relatively small in diameter. Furthermore it is inconvenient to employ such a coupler where the working space is limited, as when the pipes are in a narrow passageway or in the bottom of a ditch.

It is an object of this invention to devise a coupler of the band type which need not be forcibly spread in order to position the same about the pipes to be connected.

It is a further object of this invention to devise a novel coupler for metal pipes comprising a plurality of hingedly connected sections having means for clamping same upon a metal pipe.

It is another object of this invention to devise a novel form of band coupler constructed of corrugated sheet metal and which can be readily opened to receive a corrugated metal pipe.

Further objects of this invention will appear from the following description in which I have set forth the preferred embodiment of my invention. It is to be understood that the appended claims are to be accorded a range of equivalents consistent with the state of the prior art.

Referring to the drawings.

Figure 1:
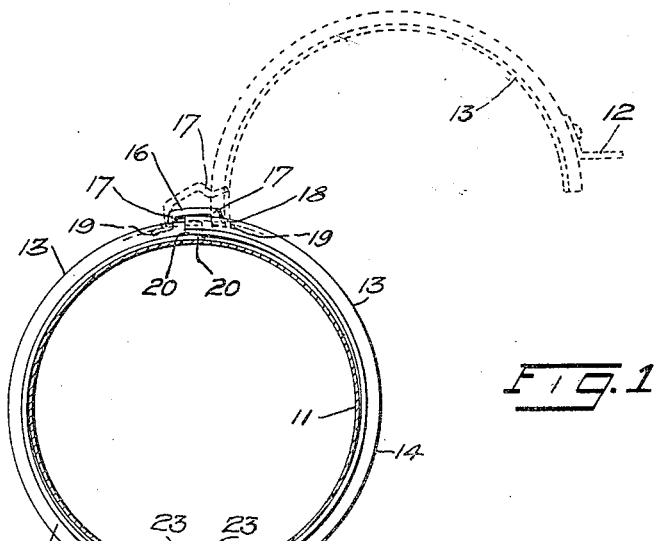
Figure 1 is a transverse cross sectional view of a metal culvert showing the use of a band coupler constructed in accordance with this invention.
Figure 2:
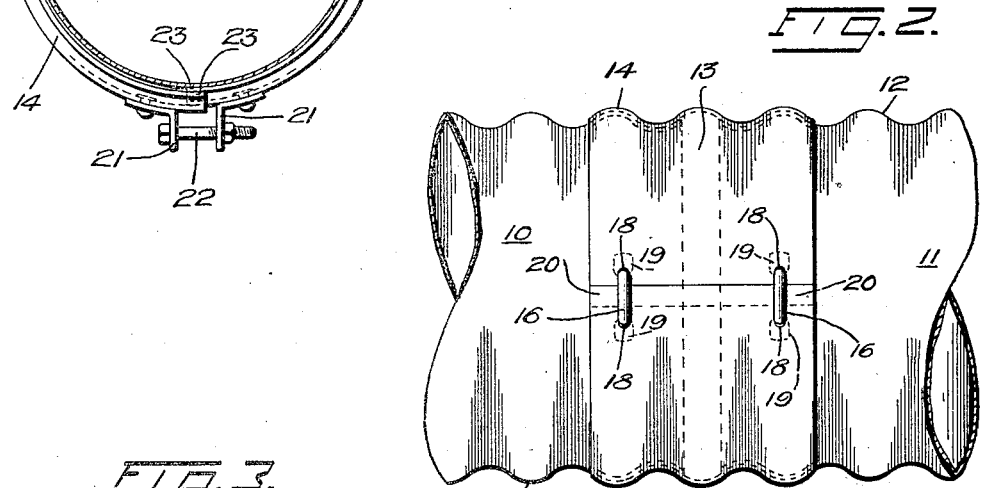
Fig. 2 is a top plan view of the coupler as shown in Fig. 1.
Figure 3:
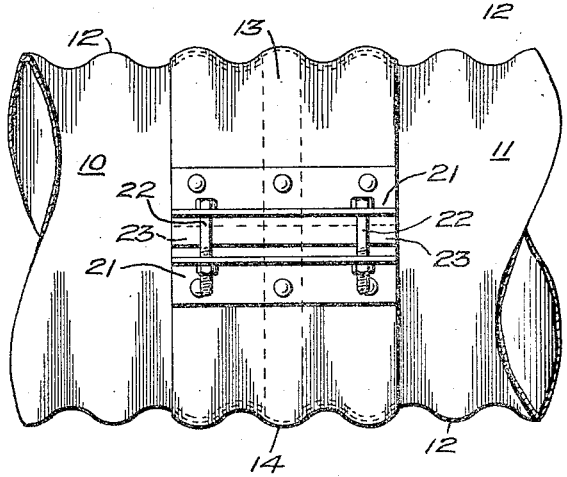
Fig. 3 is a bottom plan view of the coupler shown in Fig. 1.
Figure 4:
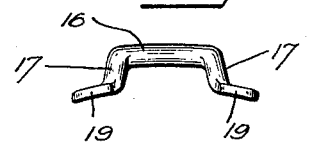
Fig. 4 is a detail showing one of the members employed in hingedly connecting together the band sections.
Figure 5:
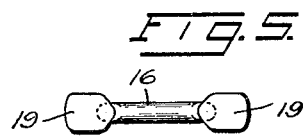
Fig. 5 is a bottom plan view of the member shown in Fig. 4.

The invention as illustrated in the drawings has been applied for the purpose of coupling together adjacent metal culvert sections 10 and 11. These sections are of the type which are made of sheet metal rolled cylindrical in shape and provided with a plurality of circumferential corrugations 12. The coupler consists of a plurality of band sections 13 which are hingedly connected together. Each of these sections is preferably formed arcuate in shape so as to fit the outer periphery of culvert and is also formed with circumferential corrugations 14 which are similar to corrugations 12 provided in the culverts 10 and 11.

A number of mechanical expedients may be employed for connecting together the band sections, although I prefer to employ a plurality of members 16 having laterally bent end portions 17. These end portions 17 are loosely inserted into apertures 18 provided along adjacent marginal portions of the band sections, and the inner end of portions 17 are provided with flattened or enlarged portions 19. These members hingedly connect together the band sections so that the couplers may be opened as shown by the dotted lines of Fig. 1. The members 16 form in effect two pivotal axes about which these sections may swing in opening the coupler, so that in the closed position the adjacent edge portions 20 of the band sections may be in overlapping relationship.

The free edges of the band sections are provided with suitable means for contracting or clamping the sections upon the culverts. For example they may be provided with angle members 21 which may be drawn together by means of bolts 22. After the band sections have been positioned upon adjacent ends of the culvert, bolts 22 are inserted and the sections contracted to tightly clamp the coupler in position. The free edges may also be provided with overlapping portions 23 to reduce leakage.

Since the corrugations 14 in the band sections are similar or complementary with the corrugations 12 in the culvert sections, an interlocking relationship is formed between the couplers and the culvert ends. The hinge connection between the coupler sections permits ready assembly and removal of the coupler without the necessity of springing or bending the sections. The particular form of hinge connection shown is cheap to manufacture and permits adequate relative movement between the sections. While only two band sections have been shown it is obvious that as many sections as desired may be employed.

I claim:

1. A metal pipe coupler comprising a band composed of a plurality of substantially semi-cylindrical sections, the adjacent longitudinal edges of said sections overlapping one another, hinge members extending through apertures adjacent the overlapping portions of said sections, said hinge members having enlarged end portions and means for contracting said band to join two sections of pipe.

2. In a metal pipe coupler, a pair of substantially semi-cylindrical sections, hinge members for hingedly connecting said sections together along longitudinal edges thereof, each of said hinge members extending through an aperture in each of said sections; the aperture in one section being displaced from the nearest longitudinal edge of the section by an amount which when added to the distance between the aperture in the other section and the nearest longitudinal edge of said other section, the sum of the distances exceeds the effective length of the associated hinge, whereby the hinged longitudinal edges of said sections overlap to provide a substantially water tight connection, and means for contracting said sections about a pipe.

3. In a metal pipe coupler, a pair of substantially semi-cylindrical sections, hinge members for hingedly connecting said sections together along longitudinal edges thereof, said hinge members extending through apertures in each of said sections, the apertures in each section being displaced from the nearest longitudinal edge of the section by an amount which is greater than one-half the effective length of the hinge members, whereby the hinged longitudinal edges of said sections overlap to provide a substantially water-tight connection, each of said hinge members comprising a metallic element terminating adjacent each of the apertures through which the hinge extends and having enlarged ends, and means for contracting said sections about a pipe.

4. In a metal pipe coupler, a pair of substantially semi-cylindrical sections, hinge members for hingedly connecting said sections together along longitudinal edges thereof, said hinge members extending through apertures in each of said sections, the apertures through which each of said hinges extends being displaced from the nearest longitudinal edge of their respective sections by amounts which when added together exceed the effective length of the hinge, whereby the hinged longitudinal edges of said sections overlap to provide a substantially water-tight connection, each of said hinge members comprising a metallic element terminating adjacent each of the apertures through which the hinge extends and having enlarged ends, and means for contracting said sections about a pipe.

In testimony whereof, I have hereunto set my hand.

ARTHUR R. HUTTON.